United States Patent [19]

Sweetman

[11] 3,945,337
[45] Mar. 23, 1976

[54] SAFETY ARCH

[76] Inventor: Dorothy M. Sweetman, Rolling Acres, Rte. 1, Box 347-B, Leesburg, Va. 22075

[22] Filed: July 29, 1974

[21] Appl. No.: 492,475

[52] U.S. Cl................ 116/36; 74/551.8; 116/28 R
[51] Int. Cl.².......................................... B60Q 1/32
[58] Field of Search............ 116/28 R, 36; 74/551.8; 350/97; 40/129 B; 280/289; 240/7.55, 7.6

[56] References Cited
UNITED STATES PATENTS

| | | | |
|---|---|---|---|
| 1,448,921 | 3/1923 | Ershkowitz | 74/551.8 |
| 1,660,131 | 2/1928 | Lenfers | 74/551.8 |
| 1,994,837 | 3/1935 | Onge | 74/551.8 |
| 3,276,416 | 10/1966 | Dirks | 116/28 R |
| 3,586,348 | 8/1971 | Rich | 350/97 |

FOREIGN PATENTS OR APPLICATIONS

| | | | |
|---|---|---|---|
| 150,357 | 8/1937 | Austria | 116/28 R |

OTHER PUBLICATIONS

American Bicyclist and Motorcyclist; p. 16; June 1967.

Primary Examiner—S. Clement Swisher
Assistant Examiner—Denis E. Corr

[57] ABSTRACT

A substantial arch; attached to handlebars or front portion of any cycle; having reflective, illuminative, or decorative attachments; the purpose of which is to make the cycle highly visible at a distance, to other vehicular drivers.

6 Claims, 5 Drawing Figures

SAFETY ARCH

BACKGROUND, SUMMARY AND OBJECTS OF THE INVENTION

Many autoists allow just inches between the cyclists and the right edge of the automobile, thus driving the cyclists off the road. Safety regulations now being considered would require light-reflecting devices to make cycles (motor or other) both visible and identifiable in the dark. Experts have found that motorists have a tendency to overlook, or simply see through, motorcyclists, and bicyclists. A study made by the University of North Carolina found that in accidents between cars and motorcycles, cars were at fault 62 percent of the time. The best solution to this, they say, is to wear bright clothing, drive with headlights on at all times — and still assume that the car about to pull out in front of you will pull out, even though the driver is looking right at you.

There have been many kinds of reflective devices, and lighting devices devised to be used on cycles as a means of letting motorists know of another vehicle in the vicinity, but most of these have been attached to the rear, pedal, or wheel areas, and have not given the appearance of either heighth or breadth of the cycle, so as to cause the autoist to allow enough space for the cylist. The SAFETY ARCH, described herein provides a means by which the autoist may see the cycle as a large vehicle and thereby will allow plenty of room to pass. The above is the primary purpose of the SAFETY ARCH, but a secondary purpose is to add glamour, variety, or individuality to the cycle. Most small children do not ride their vehicles in the streets and therefore do not need this device as a safety feature, but they would enjoy the bright colors and the look of the adult vehicles nevertheless.

GENERAL DESCRIPTION

The SAFETY ARCH can be of tubular material identical to handlebars and can be made as an integral part of the cycle. It can be made of any thin or heavy; flexible or rigid material. It can be attached to the vehicle in many ways and in many positions on the vehicle (not necessarily the handlebars). It can have reflectors, colored beads, reflecting tape, buttons, tassles, fringe, and/or lights for night illumination. In its simplest form (for instance, for children's vehicles) the SAFETY ARCH may be made of heavy wire, plastic, fibres, reeds, or bamboo, and may be braided, tubular, or other forms, or of any material which will support the beads, buttons, tassles, reflectors, pin wheels, noise makers, and/or lights. Any variety of small ornaments may be used so long as the SAFETY ARCH will support the weight without sagging. The more elaborate forms of the SAFETY ARCH may be made of suitable coated or plated ferrous material, painted or unpainted, tubular in form or of any other cross section which may be formed into an arch and which will support the above reflectors and decorations. The material itself may be reflective, or may be stamped into a form that will reflect from a design such as a star or diamond repeated the length of the SAFETY ARCH. It may hold electric lights — also may hold safety glass or plastic for deflecting the wind and weather. These arches can be made in a variety of shapes such as H, M, upside down U, square, heart shaped, or other, however, the preferred embodiment is shown in the figures herewith.

DETAILED DESCRIPTION

Figures 1, 2:
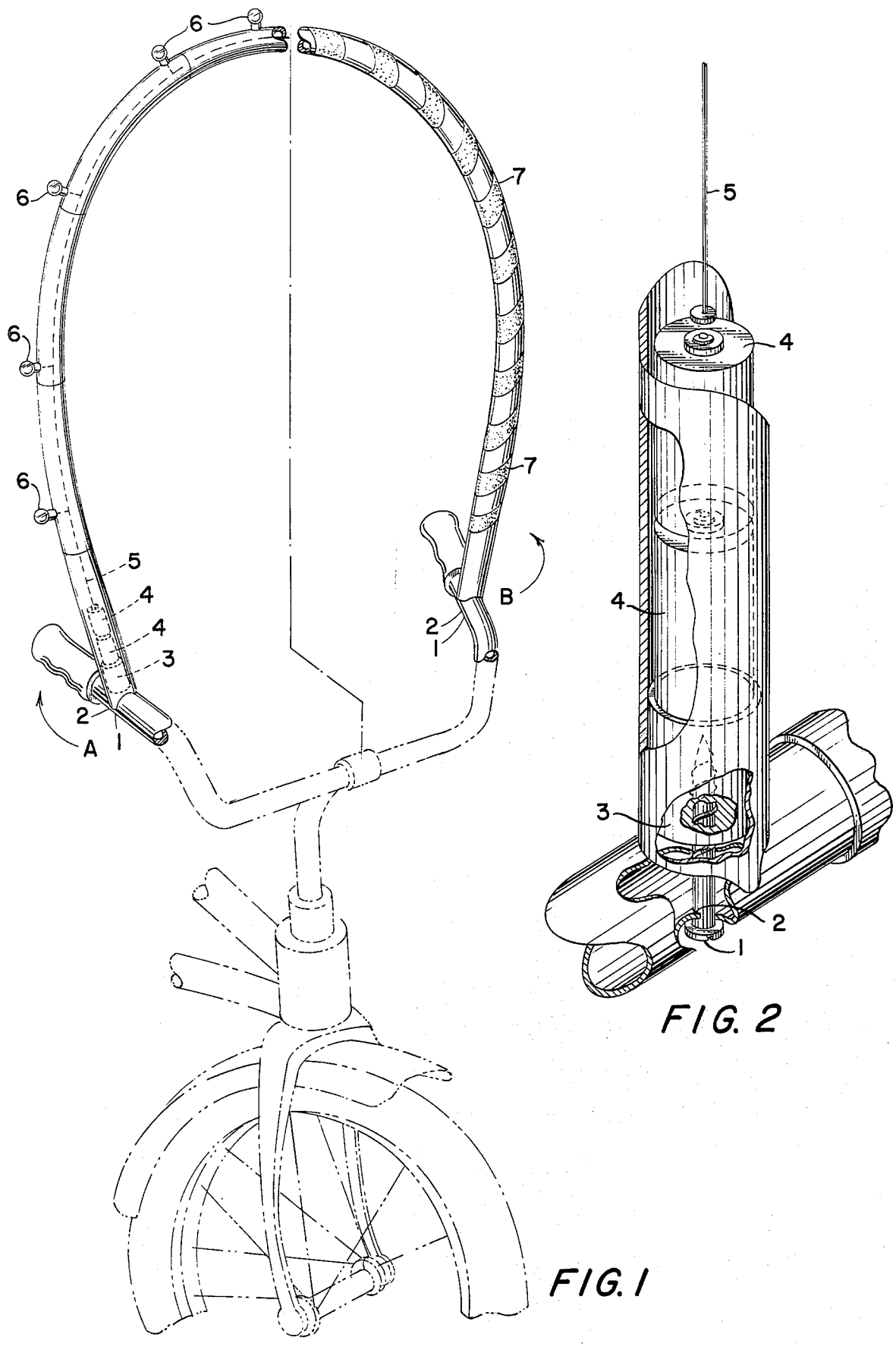
FIG. 1 is a fragmentary perspective view of a typical cycle showing handlebar structure with SAFETY ARCH attached.
FIG. 2 shows an enlarged view of the preferred means of attaching the SAFETY ARCH to the handlebars.

FIG. 1 shows the forward portion of a cycle with SAFETY ARCH attached to handlebars at points A and B to designate left and right sides of the handlebars. The preferred embodiment is a rounded arch form constructed of tubular cross section as is common in the handlebars, and can be manufactured as an integral part of the handlebars. It should be understood that the arch form could be squared or of any other generally arched shape which would give visual heighth and breadth to the vehicle. It should also be understood that any suitable cross section could be used. FIG. 1-A (left-hand side) shows plug 3, batteries 4—4, electric wire 5, and lamps 6-6-6-6, inserted into the tubular section of the SAFETY ARCH. Not shown is an ON-OFF switch similar to those used in flashlights. This arrangement for illumination does not preclude the use of a generating device (already in use) attached to the main wheel(s) of a cycle — for powering the lights. Also, ordinary flashlights or other lighting arrangements may be used. FIG. 1-B (right-hand side) shows reflecting tape 7 wound around the SAFETY ARCH. This could be used in addition to the electric lights, or alone, or in combination with any other reflective, decorative, noise making, or eye catching devices.

FIG. 2 shows an enlarged view of one means of attachment. This consists of a screw 1 inserted through holes in the handlebars at points 2 into a plug 3 inside the ends of tubular material forming the SAFETY ARCH. This does not restrict the type of means for attaching any safety arch to any forward portion of any small vehicle. It is understood that any other suitable means such as rings and screws, clamps, nuts and bolts, rivets, or other fastening devices of conventional form commonly used to provide a secure joining of SAFETY ARCH to vehicle, may be used. Above plug 3 are shown batteries 4—4, and electric wire 5.

Figure 3:
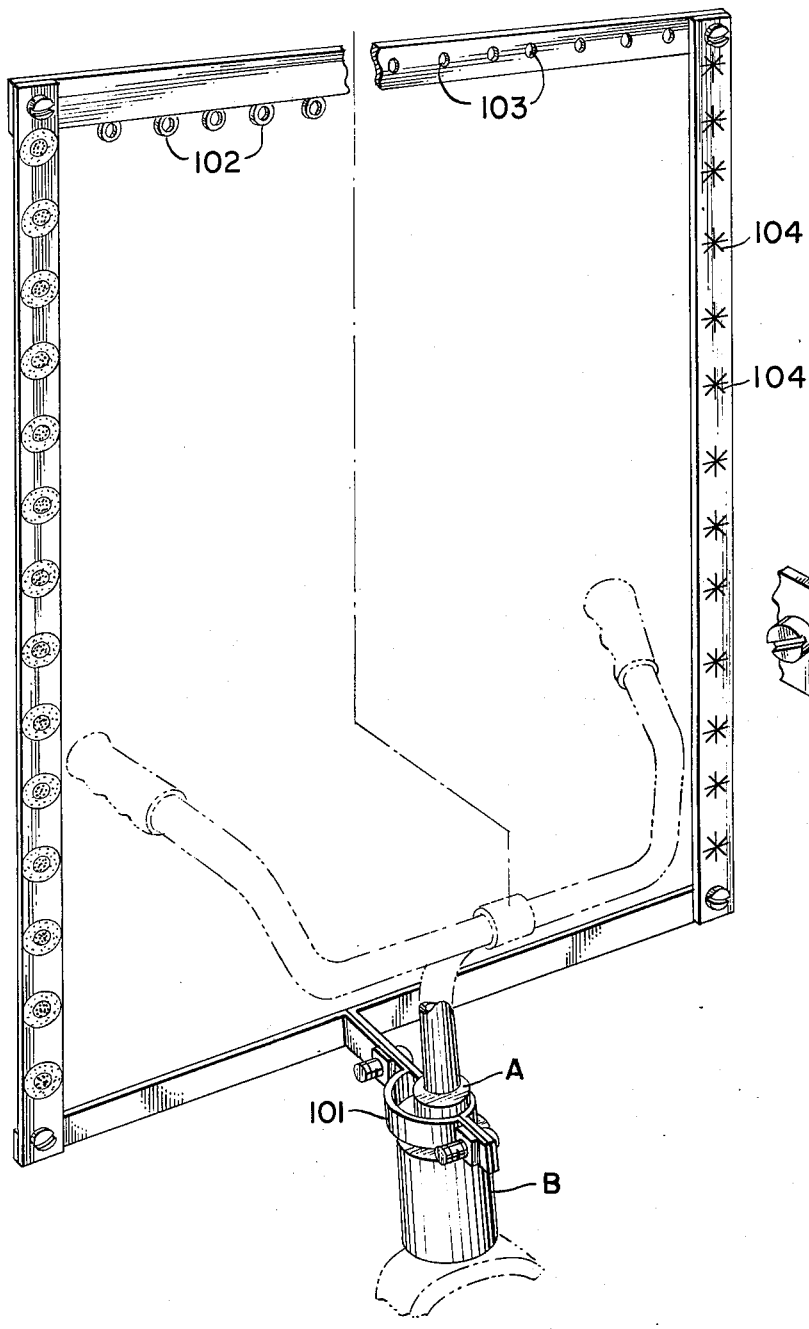
FIG. 3 shows another form of the SAFETY ARCH

FIG. 3 shows another shape and other means of attaching the SAFETY ARCH. 101 is a clamp with ordinary nuts and bolts. This clamp can be attached at either A or B (FIG. 3) of the main post which holds the handlebars; and it secures the SAFETY ARCH to the front portion of the cycle. This second form of SAFETY ARCH includes eyelets 102, holes 103, decorative stamping 104, and other reflective devices. The purpose of the eyelets and/or holes is so that eye-catching devices; wind and rain deflecting safety glass; or plastic shields - may be attached.

Figure 4:
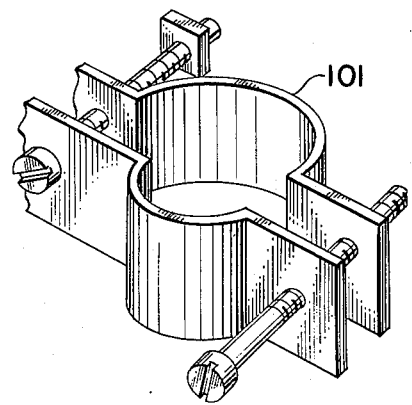
FIG. 4 shows a simple clamp to hold the SAFETY ARCH of FIG. 3.

FIG. 4 is an enlarged view of clamp numbered 101 in FIG. 3.

Figure 5:
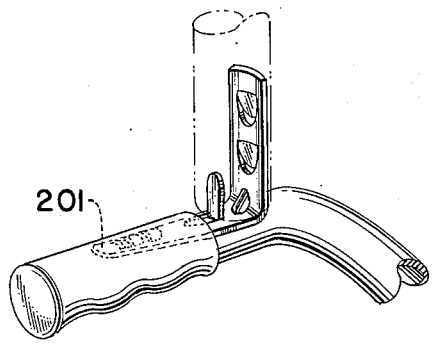
FIG. 5 shows one simple brace as a means of attaching the SAFETY ARCH to the handlebars.

FIG. 5 shows a common brace which is pushed under the handle grip and which uses either friction or other ordinary means, i.e., nuts and bolts, rivets, with which to attach the SAFETY ARCH to the handlebars. Illustrated is the brace with tapered end pointing toward the left 201, but this brace could be so positioned near the end of the handlebar so as to point the tapered end to the right. This would place the ends of the SAFETY ARCH on the extreme outward ends of the handlebars, giving even more apparent width to the vehicle.

What is claimed:

1. A reflective safety-signal device for the front of a vehicle of the type adapted to have a rider seated thereon and having handlebars, comprising a reflective member of inverted, substantially U-shaped form, having a width approximately that of said handlebars, and a height greater than said rider's head when said rider is seated on said vehicle, and means to attach said member on the front of said vehicle, whereby said signal is easily apparent to approaching drivers, apprising them of the presence, position and width of said vehicle.

2. A safety-signal device, as defined in claim 1, wherein said reflective member is integral with said handle bars of said vehicle.

3. A safety-signal device, as defined in claim 1, wherein said attaching means is for joining the reflective member to the handlebars.

4. A safety-signal device, as defined in claim 1, wherein said reflective member is integral with hand grips adapted to be used on said handlebars.

5. A safety-signal device, as defined in claim 1 which can be telescoped.

6. A safety-signal device, as defined in claim 1, wherein said attaching means is for joining the reflective member to the main post of said vehicle.

* * * * *